United States Patent [19]
Thompson et al.

[11] 3,960,343
[45] June 1, 1976

[54] DOUBLE WALL DUCTING

[75] Inventors: Harold R. Thompson, Simi Valley; Ralph A. Anderson, Burbank, both of Calif.

[73] Assignee: SSP Products, Inc., Burbank, Calif.

[22] Filed: Oct. 29, 1974

[21] Appl. No.: 518,377

[52] U.S. Cl. .............................. 244/1 R; 138/143; 138/173; 244/42 CC
[51] Int. Cl.² ....................................... B64D 47/00
[58] Field of Search............. 244/42 CC, 53 R, 1 R, 244/129 R; 138/142, 143, 148, 177, 173, 170, 171, 172, 120, 121, 122

[56] References Cited
UNITED STATES PATENTS

| | | | |
|---|---|---|---|
| 1,153,724 | 9/1915 | Stocker | 138/173 |
| 1,623,112 | 4/1927 | Hall | 138/173 |
| 1,624,485 | 4/1927 | Ferris | 138/148 |
| 2,104,884 | 1/1938 | Quarnstrom | 138/142 |
| 2,209,402 | 7/1940 | Kepler | 138/171 |
| 2,274,519 | 2/1942 | Barrett | 138/142 |
| 2,707,493 | 5/1955 | Bonvillian et al. | 138/148 |
| 2,794,319 | 6/1957 | Stockdale | 138/173 |
| 2,878,837 | 3/1959 | Burtt | 138/148 |
| 3,090,584 | 5/1963 | Kuchemann et al. | 244/42 CC |

*Primary Examiner*—Trygve M. Blix
*Assistant Examiner*—Galen L. Barefoot
*Attorney, Agent, or Firm*—Huebner & Worrel

[57] ABSTRACT

A lightweight, high-strength duct comprised of two thin annular tubes, one fitted within the other, the outer tube having spaced annular stiffening beads extending radially outwardly therefrom, and one of the tubes being vented to prevent pressure differentials between the inner surface of the outer tube and the outer surface of the inner tube at various altitudes and temperatures.

18 Claims, 5 Drawing Figures

U.S. Patent  June 1, 1976  3,960,343
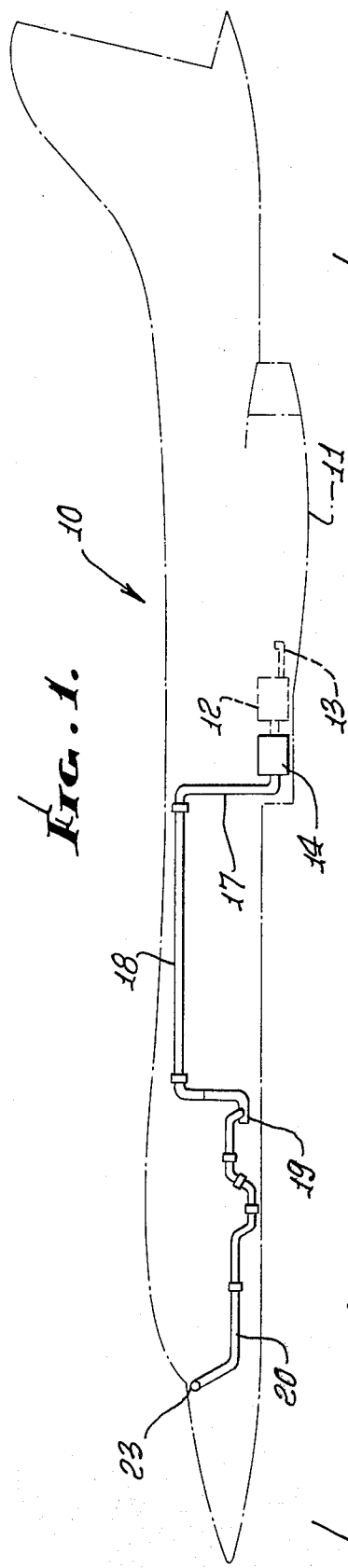
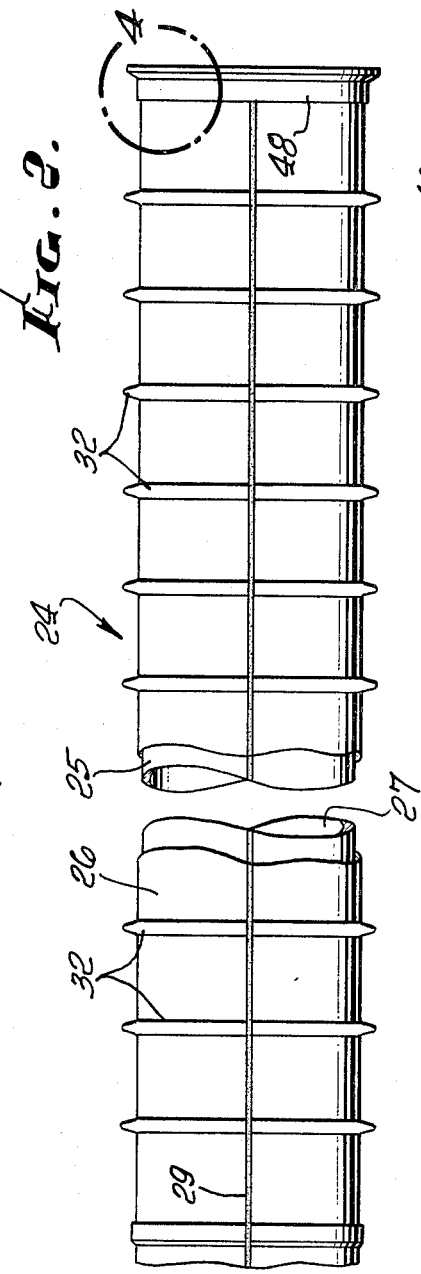
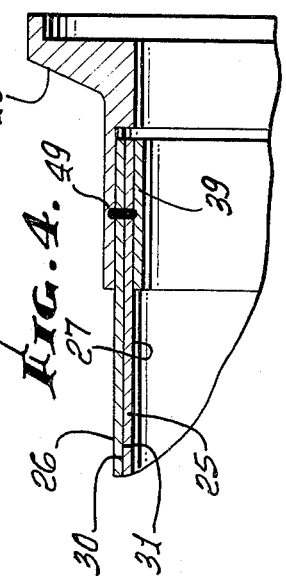
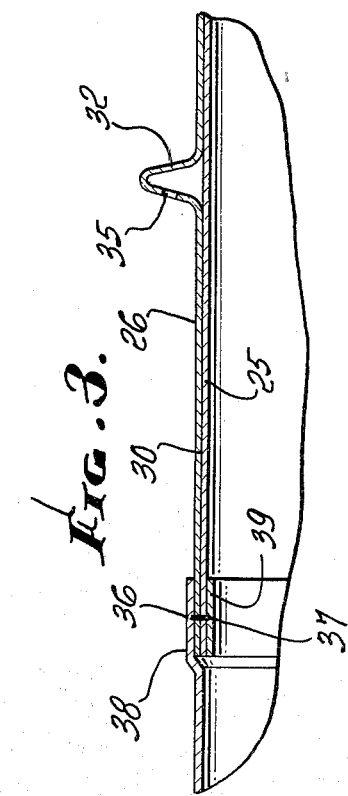

DOUBLE WALL DUCTING

BACKGROUND OF THE INVENTION

The invention relates to a lightweight, high-strength double wall duct system for use in jet aircraft. The system is particularly useful in jet aircraft where weight saving is important. One of the uses of the system is to carry compressed bleed air to the interior of the aircraft from jet engines in which the air has been compressed by the engine compressor and bled off from the engine forwardly of the burning chambers. The ducts may be made from thin sheet metal, such as titanium, aluminum, Inconel 625 alloy or Cres 321 alloy.

Prior ducting for the same purposes has been made from metal having a thickness of from 0.020 to 0.025 inch, which in a single tube duct has approximately the same strength as the double wall duct, according to the invention, but weighs approximately two times as much.

SUMMARY OF THE INVENTION

It is an object of the invention to provide improved lightweight, high-strength ducts.

It is another object of the invention to provide an improved ducting system for carrying compressed bleed air from jet engines to the interior of the aircraft. This air is used primarily for air conditioning the aircraft, for rain removal from the windshield and for deicing the windshield.

It is still another object of the invention to provide lightweight, high-strength ducting comprised of two concentric tubes, the outer tube having radially extending, continuous spaced convolutions forming stiffening beads, and the inner duct having a smooth interior to provide for an uninterrupted air flow therethrough.

It is a further object of the invention to provide ducting, as described in the previous paragraph, in which the outer tube is vented to prevent pressure differentials between the inner surface of the outer tube and the outer surface of the inner tube at various altitudes and temperatures.

It is a still further object of the invention to provide double wall ducting in which the inner tube is vented to the outer tube so that the pressure between the two tubes will always be the same as the pressure in the inner tube. In this arrangement the inner tube functions as a flow liner and the outer tube carries the system pressure. An advantage of this embodiment is that both tubes carry the external atmospheric pressure that would collapse unsupported thin wall tubes.

Further objects and advantages of the invention may be brought out in the following parts of the specification wherein small details have been described for competance of disclosure, without intending to limit the scope of the invention which is set forth in the appended claims.

BRIEF DESCRIPTION OF THE DRAWINGS

Referring to the accompanying drawings, which are for illustrative purposes:

FIG. 1 is a side elevational view in phantom outline of a jet aircraft, illustrating the use of the invention;

FIG. 2 is a side elevational view of the double wall ducting according to the invention;

FIG. 3 is a fragmentary cross-sectional view of the ducting shown in FIG. 2;

FIG. 4 is a fragmentary cross-sectional view illustrating a flanged end of the ducting, shown within the circle 4 in FIG. 2; and FIG. 5 is a fragmentary cross-sectional view illustrating another embodiment of the invention.

DESCRIPTION OF THE PREFERRED EMBODIMENTS

Referring again to the drawings, there is shown in FIG. 1 a jet aircraft, generally designated as 10, having a jet engine 11 and a conventional air compressor 12 at its forward end. Connected to the compressed air chamber downstream of the compressor is a compressed air bleed-off line 13 which carries the bled-off compressed air to a conventional air cooler 14 and from the cooler extends a line 17 carrying cooled compressed air to the interior of the aircraft. The line 17 is joined to a horizontal double wall 18, according to the invention. The ducting 18 is connected to the aircraft air conditioning system, as at 19, and is also connected to a forwardly extending line 20 which provides compressed air for removing rain and ice from the windshield, as at 23.

In FIG. 2 there is shown one section, generally designated as 24, of the ducting 18. According to the invention, the annular duct section 24 is comprised of a cylindrical inner tube 25 and a substantially cylindrical outer tube 26, both being approximately the same thickness. Each of the tubes is constructed of thin sheet metal, butt welded together at their longitudinal edges, as at 29. The outside diameter of the inner tube is approximately equal to the inside diameter of the outer tube so that the outer surface 30 of the inner tube is snugly fitted within the outer tube, the surface 30 being in substantial contact throughout with the inner surface 31 of the outer tube 26. The inner tube 25 has a smooth cylindrical surface 27 to provide uninterrupted gas flow therethrough.

The outer tube is formed having longitudinally spaced annular convolutions, each forming a continuous stiffening bead 32 extending radially outwardly from the outer tube, generally in a plane substantially perpendicular to the axis of the tubes. As seen in FIG. 3, the cross sections of the beads 32 are generally V-shaped. Extending laterally through each bead is a venting passage 35 which prevents entrapment of air between the inner surface of the outer tube and the outer surface of the inner tube so that pressure differentials cannot be created because of changes in altitude and temperature. If the tubes were not so vented, they would tend to separate from substantial altitude changes or as a result of substantial temperature changes of the ambient air.

As shown in FIGS. 3 and 4, the tube sections are secured together at convenient lengths or intervals, as at 36, by a continuous annular sealing weld 37, the tube sections being sealed together at their ends, as necessary. Inwardly of the duct 25 is a snugly fitted weld band 39, welded to the inner tube by the weld 37. At the connecting area 36 in FIG. 3, fitted over the two ducts is a flange 38, by which the double wall ducting is welded to a single tubular member 42.

In FIG. 4 a connecting flange 48 is shown secured to the ends of the double wall ducts 25 and 26 by a continuous annular sealing weld 49. An interior weld band 39 is snugly fitted within the inner tube 25 and welded thereto.

In FIG. 5, another embodiment of the invention is shown. Here, the double wall ducting is the same as that previously described except for the venting.

Forming the ducting, there are a cylindrical inner tube 51 and a substantially cylindrical outer tube 52 of approximately the same thickness. They are secured together in the same manner as the ducting shown in FIGS. 2–4.

The outer tube is formed having spaced annular convolutions, forming stiffening beads 53, equivalent to beads 32, shown in and described with respect to FIG. 3, except that the beads 53 do not have vent holes. In this embodiment, the venting means are vent holes 54 through the wall of the inner tube 51. They are longitudinally spaced to be in radial alignment with the beads 53, at least one vent per bead. Each pair of tubes must be sealed together at their ends or at approximate intervals to prevent leaks of air from between the tubes. This is accomplished by welds, as 36 in FIG. 3.

In this arrangement the inner tube or ply functions as a flow liner and the outer ply or tube carries the system pressure. The vented inner tube prevents pressure differentials between the two plies at various altitudes and temperatures. An advantage of this embodiment, in addition to providing a smooth flow path, is that both plies carry the external atmospheric pressures that would collapse unsupported prior art thin wall tubes.

In one structure of the invention, the tubes 25 and 26 have a diameter of approximately 6 inches and are made from titanium sheets, each having a thickness of about 0.006 inch and lengths of about 120 inches. The beads 32 on the outer tubing are conveniently positioned about 3 inches apart and have a radial length of about 0.35 inch outwardly of the tube, a width of approximately 0.18 inch at their outer ends, and a width of approximately 0.25 inch at their inner ends of the cylindrical tubing surface. The vent holes have a diameter of 0.062 inch. The double wall duct tubing has a test pressure requirement of 325 lbs. per square inch and is made to carry compressed air having temperatures up to 525°. The operating pressure of the air is generally about 65 lbs. per square inch. In FIG. 1 the horizontal length of the double wall ducting 18 is approximately 45 feet. This substantial length of lightweight, high-strength of air service tubing has an obvious advantage in an aircraft.

The invention and its attendant advantages will be understood from the foregoing description and it will be apparent that various changes may be made in the form, construction and arrangement of the parts of the invention without departing from the spirit and scope thereof or sacrificing its material advantages, the arrangements hereinbefore described being merely by way of example. We do not wish to be restricted to the specific forms shown or uses mentioned except as defined in the accompanying claims, wherein various portions have been separated for clarity of reading and not for emphasis.

We claim:

1. For use in jet aircraft, a lightweight, high-strength duct comprising:

two thin annular sheet metal tubes, the tube metals being equivalents, one of said tubes being snugly fitted within the other, said tubes having substantially continuous cylindrical wall surfaces, the inner surface of the outer tube being in substantially coextensive contact with the outer surface of the inner tube, longitudinally spaced stiffening members on the outer tube, said stiffening members being spaced by relatively long expanses of cylindrical wall surface, and venting means in one of the tubes to prevent pressure differentials between the two tubes at various altitudes and temperatures, said duct having approximately the same strength as a single wall tube of an equivalent metal weighing twice as much.

2. The invention according to claim 1 in which:

said stiffening members are annular stiff, self-supporting beads, V-shaped in cross section, extending radially outwardly from the outer tube.

3. The invention according to claim 2 in which:

said venting means is a vent hole in one or more of said beads.

4. The invention according to claim 2 in which:

said venting means is one or more holes through the wall of the inner tube.

5. The invention according to claim 1 in which:

said tubes are sealed together at spaced longitudinal intervals.

6. The invention according to claim 1 in which:

the inner surface of the inner tube is smooth for uninterrupted flow therethrough.

7. The invention according to claim 6 in which:

each tube is butt welded along its longitudinal edges.

8. The invention according to claim 1 in which:

the ratio of longitudinal cylindrical wall surface length between stiffening members to the longitudinal length of the stiffening members is of the order of approximately 11 to 1.

9. The invention according to claim 1 in which:

the ratio of longitudinal cylindrical wall surface length between stiffening members to the longitudinal length of the stiffening members is at least 11 to 1.

10. The invention according to claim 1 in which:

the sheet metal tubes each have a wall thickness of approximately 0.006 inch, and the sheet metal is one selected from the group consisting of titanium, aluminum, Inconel 625 alloy, and Cres 321 alloy.

11. The invention according to claim 1 in which:

the sheet metal tubes each have a wall thickness of approximately 0.006 inch, and the sheet metal is titanium.

12. In a jet engine powered aircraft, a jet engine having an air compressor, and air bleed line extending from said engine aft of said compressor to bleed off compressed air, a compressed air cooler for receiving and cooling said bleed air, a discharge air line from said cooler receiving said cooled air and being connected to an air service duct of the aircraft;

the improvement in said air service duct comprising:

two thin annular sheet metal tubes, the tube metals being equivalents, one of said tubes being snugly fitted within the other, said tubes having substantially continuous cylindrical wall surfaces, the inner surface of the outer tube being in substantially coextensive contact with the outer surface of the inner tube, longitudinally spaced stiffening members on the outer tube, said stiffening members being spaced by relatively long expanses of cylindrical wall surface, and venting means in one of the tubes to prevent pressure differentials between the two tubes at various altitudes and temperatures, said duct having approximately the same strength as a single wall tube of an equivalent metal weighing twice as much.

13. The invention according to claim 12 in which:
said tubes are sealed together at spaced longitudinal intervals.

14. The invention according to claim 12 in which:
the ratio of longitudinal cylindrical wall surface length between stiffening members to the longitudinal length of the stiffening members is of the order of approximately 11 to 1.

15. The invention according to claim 12 in which:
the ratio of longitudinal cylindrical wall surface length between stiffening members to the longitudinal length of the stiffening members is at least 11 to 1.

16. The invention according to claim 12 in which:
said stiffening members are annular stiff, self-supporting beads, V-shaped in cross section, extending radially outwardly from the outer tube.

17. The invention according to claim 16 in which:
said venting means is a vent hole in at least one of said beads.

18. The invention according to claim 16 in which:
said venting means are comprised of a plurality of longitudinally spaced vent holes,
each of said vent holes being positioned to vent adjacent a respective bead.

* * * * *